United States Patent Office 3,709,974
Patented Jan. 9, 1973

3,709,974
VANADIUM RECOVERY PROCESS
John F. Nutter, Golden, and Frank C. Haas and David L. Thompson, Arvada, Colo., assignors to The Oil Shale Corporation, New York, N.Y.
No Drawing. Filed July 19, 1971, Ser. No. 164,023
Int. Cl. C22b 59/00
U.S. Cl. 423—63                                                  7 Claims

ABSTRACT OF THE DISCLOSURE

A hydrometallurgical process is provided for recovering vanadium values from a vanadium-bearing calcium-rich ore. The process involves treating an aqueous slurry of the ore with lime under elevated pressure and temperature conditions. The vanadium values are thereafter solubilized and recovered.

BACKGROUND OF THE INVENTION

The present invention relates generally to a process for recovering vanadium values from vanadium-bearing ores by way of a pressure hydrometallurgical procedure. The process is particularly useful for recovering vanadium values from low-grade ores which contain relatively large concentrations up to 75 weight percent or more of lime-producing calcium compounds such as calcite, dolomite, and the like. Such lime-producing compounds may constitute a major portion of the ore's matrix, although the process is also applicable to calcium-deficient vanadium-bearing ores to which calcium compounds may be added to form highly alkaline aqueous slurries. A calcium-deficient ore is one which contains little or no lime-producing compounds.

For quite some time, vanadium-bearing ores have been roasted with a fluxing or transposing agent which reacts to form soluble vanadium compounds. The most common fluxing reagents include salt and/or soda ash. The roasted calcines are leached with water and the vanadium compounds recovered from the leach liquor by precipitation techniques. Other widely used vanadium recovery schemes involve direct acid or soda ash leaching of vanadium ores. Regardless of the prior art procedure selected, high calcium concentrations in the ore result either in the formation upon roasting of insoluble vanadates or excessive reagent consumption during the leach operation. Usually, such processes are restricted, economically, to ores containing less than five percent (5%) lime, whereas the present invention may advantageously recover vanadium values from ores containing substantially greater amounts.

In the vanadium recovery process of U.S. application Ser. No. 80,778, filed Oct. 14, 1970, now U.S. Pat. 3,656,936, the vanadium-bearing calcium-rich ore is roasted or calcined at temperatures between 600° C. and 1100° C. to convert the vanadium values into a species which can be successfully extracted from the calcine via the procedure disclosed therein. While that process is entirely satisfactory, the large capital investment, operating costs, and process control difficulties inherent in the roasting equipment, and particularly in the preferred fluidized bed apparatus, has resulted in the development of the process of the present invention which does not require the roasting pretreatment step.

SUMMARY OF THE INVENTION

It is, therefore, a primary object of the present invention to provide a process for recovering vanadium values from highly alkaline, low-grade vanadium-bearing calcitic ores which involves a pressure hydrometallurgical procedure to convert the vanadium precursor to a recoverable calcium vanadate species.

A further object of the invention is to provide a vanadium feed preparation and leach or solubilizing process which eliminates the roasting or calcination procedures heretofore utilized to provide a source of extractable vanadium.

These and other objectives may be accomplished according to the present invention by treating an aqueous slurry of vanadium-bearing calcium-rich ore admixed with from about 42 pounds to about 425 pounds of lime (calcium oxide) per ton of ore by pressure (i.e., from about 70 p.s.i.g. to about 575 p.s.i.g.) hydrometallurgical procedures at a temperature of from about 150° C. to about 250° C. for from about 0.5 hour to about 2 hours to convert the vanadium precursor to vanadium species of limited solubility at the highly alkaline conditions of the slurry. The vanadium species formed in this manner are not readily identifiable, although it is believed that various calcium vanadates are formed. The slurry from the pressure-lime treatment procedure usually has a pH above about 10.5. The insoluble vanadium values, probably calcium vanadates, are then solubilized. This can be achieved by either of two alternative procedures, one of which is by introducing carbon dioxide into the slurry in an amount sufficient to lower the pH to between about 5 and about 9. The carbon dioxide addition also advantageously serves to precipitate calcium carbonate which may be desirably recycled to a roast operation for regenerating carbon dioxide. The other procedure for solubilizing the vanadium values is the admixing of a sodium carbonate, ammonium carbonate and/or sodium hydroxide solution with the slurry in an amount of from about 40 pounds to about 72 pounds of such solute per ton of ore and heating at a temperature of from about 90° C. to about 225° C. for from about 0.5 hour to about 4 hours. The solubilized vanadium values may then be recovered by conventional techniques.

DESCRIPTION OF THE PREFERRED EMBODIMENT

Finely divided vanadium-bearing calcitic shale ore is slurried in water and admixed with from about 150 to about 225 pounds of calcium oxide per ton of ore. The slurry is placed in an autoclave and heated to a temperature between about 175° C. to about 225° C. Such temperatures result in pressures which vary from about 129 p.s.i.g. at 175° C. to about 370 p.s.i.g. at 225° C. The autoclave is maintained at the desired temperature for a period of from about 0.5 hour to about 2 hours. The solids content of the slurry is between about 2% and about 50% by weight. The slurry is then cooled, the pH lowered by the addition of carbon dioxide to solubilize the vanadium values which are thereafter recovered.

In certain situations where the ore body is located in a remote region, it may be convenient to utilize the calcitic content of the ore to provide the lime (calcium oxide) requirement. Under such circumstances, the lime may be obtained by calcining a portion of the ore.

It is known that the particular vanadium species formed according to this process has a limited water solubility at pH's above about 10.5 and is highly water soluble at pH's between about 5 and about 9 with the best recoveries being obtained at pH's between about 6 and about 7.5. These lower pH values are difficult to measure accurately because as the pressure is released by opening the vessel, carbon dioxide is evolved thereby raising the pH.

The initial pH of the slurry prior to the addition of carbon dioxide is usually above about 10.5. Carbon dioxide is added to lower the pH to between about 5 and about 9, although the optimum recoveries have been obtained at pH's between about 6 and about 7.5 and at a solids content of about 20% by weight. The addition of carbon dioxide to the slurry not only solubilizes the vanadium values, it also reacts with the lime to precipitate calcium carbonate. The amount of carbon dioxide required is ideally that amount which is formed during calcite decomposition upon roasting a portion of the calcitic ore and returned to the slurry to convert the lime back to calcite.

While the carbonation solubilizing technique yields varying amounts of soluble vanadium values, vanadium recoveries may be significantly improved by shifting the solubility equilibrium. The improved recovery is obtained by admixing a strong basic anion exchange resin with the slurry in an amount of from about 0.25 cubic foot to about 0.75 cubic foot of resin/ton of ore. In a continuous process, it is desirable to maintain the pH of the slurry within the desired range through the constant addition of carbon dioxide thereto. The carbonation step may be carried out prior to or concurrent with the addition of resin to the slurry. As the soluble vanadium anions are extracted or adsorbed by the resin, the concurrent introduction of carbon dioxide maintains the desired pH to affect additional vanadium value solubilization and extraction. The adsorbed vanadium is thereafter stripped or eluted from the resin and recovered by conventional techniques. The use of such anion exchange resins makes it feasible to adsorb up to 99% of the extractable or solubilized vanadium for overall yields from the ore in the order of at least 50% to 60%. Optimum vanadium extraction is accomplished through the use of multiple countercurrent adsorption and elution stages.

Among the suitable anion exchange resins are the strong base quaternary amine anion exchange resins. Some of the resins found to be useful for extracting vanadium values from the pulp are the resins marketed under the tradenames "Amberlite IRA-400," "Amberlite IRA-425," and "Dowex-21K." "Amberlite IRA-400" and "Amberlite IRA-425" are strongly basic anion exchange resins containing a quaternary ammonium group prepared by reacting a tertiary amine with a chloromethylated copolymer of styrene and divinylbenzene as described in U.S. Pat. No. 2,591,573. These two resins are the same except that "Amberlite IRA-425" is specifically made for resin-in-pulp (RIP) processes. "Dowex-21K" is a strong base quaternary amine resin manufactured from a copolymer of styrene and divinylbenzene which has been chloromethylated and then aminated with trimethylamine. The "Dowex-21K" resins is also specifically made for resin-in-pulp (RIP) operations. Additional resin characteristics may be found in the manufacturers' literature (Rohm & Haas for "Amberlite" resins and Dow Chemical for "Dowex" resins).

After the various resins have adsorbed the optimum amount of vanadium values, the loaded resin is screened from the slurry and the vanadium removed from the resin by contacting the resin with a suitable eluting solution. Aqueous eluting solutions of sodium chloride, sodium chloride-ammonium chloride, sodium hydroxide, and sulfurous acid may be used to strip the resin. The most practical eluting solutions are sodium chloride or sodium chloride-ammonium chloride wherein the concentration of sodium chloride is in the order of 20% by volume. The most satisfactory elution temperature is about 50° C. to 70° C. The vanadium is thereafter recovered in its pentoxide form by precipitating it as ammonium metavanadate with ammonium chloride and then roasting the precipitate to form vanadium pentoxide ($V_2O_5$).

Various embodiments of the process of the invention will be further illustrated by the representative examples set forth below.

EXAMPLES 1–19

These examples demonstrate the effect of lime (calcium oxide) concentration, autoclave temperature and pressure, and treatment time.

Portions of a composite calcitic shale ore sample containing 0.72% vanadium pentoxide were admixed with varying amounts of reagent grade lime and slurried in water at a solids content of 20% by weight. The slurries were placed in an autoclave and heated to various temperatures and pressures. The autoclave was maintained at the desired temperature for various time periods. After cooling the autoclave to room temperature, the slurry having a pH of about 10.5 or higher was removed and carbonated by bubbling carbon dioxide into the slurry for about one to two minutes to lower the pH to 6.5.

The carbonated slurries were mixed with 0.5 cubic feet of various forms of a strong base anion exchange resin ("Amberlite IRA-425") per ton of ore and extracted for about 15 minutes at ambient temperature to load the resin with vanadium anions. Carbon dioxide was continuously added to the slurry during the extraction operation. The resin was screened from the slurry, thereafter stripped or eluted of the vanadium anions with a sodium chloride eluting solution, the vanadium precipitated as ammonium metavanadate with ammonium chloride and the precipitate roasted to form $V_2O_5$. The results are presented in the following Table I.

TABLE I

[$CO_2$-RIP leach of reagent grade lime-treated calcitic shale]

| Example number | Lbs. CaO added per ton of ore | Treatment Temp. (° C.) | Treatment Pressure (p.s.i.g.) | Treatment Time (hrs.) | Percent $V_2O_5$ extracted |
|---|---|---|---|---|---|
| Control | 0 | 225 | 370 | 1 | 0 |
| 1 | 42 | 200 | 225 | 1 | 24 |
| 2 | 42 | 200 | 225 | 2 | 22 |
| 3 | 42 | 225 | 370 | 1 | 23 |
| 4 | 128 | 225 | 370 | 0.5 | 34 |
| 5 | 128 | 225 | 370 | 1 | 39 |
| 6 | 150 | 225 | 370 | 1 | 49 |
| 7 | 170 | 150 | 69 | 0.5 | 14 |
| 8 | 170 | 150 | 69 | 1 | 26 |
| 9 | 170 | 175 | 129 | 0.5 | 28 |
| 10 | 170 | 175 | 129 | 1 | 32 |
| 11 | 170 | 200 | 225 | 0.5 | 29 |
| 12 | 170 | 200 | 225 | 1 | 39 |
| 13 | 170 | 225 | 370 | 1 | 54 |
| 14 | 170 | 250 | 577 | 1 | 42 |
| 15 | 212 | 225 | 370 | 1 | 48 |
| 16 | 255 | 225 | 370 | 0.5 | 35 |
| 17 | 255 | 225 | 370 | 1 | 37 |
| 18 | 255 | 225 | 370 | 2 | 35 |
| 19 | 425 | 250 | 577 | 1 | 42 |

From the comparative data in the above Table I, it can be seen that optimum vanadium recoveries as high as 54% $V_2O_5$ (Example 13) are achieved at autoclave temperatures and pressures in the order of 225° C. and 370 p.s.i.g. using 170 pounds of lime per ton of ore for a treatment period of one hour. When lime was omitted during the pressure hydrometallurgical treatment of the ore (Control Example), no vanadium was recovered. The data for Examples 3, 5, 6, 13, 15 and 17 indicate that at constant temperature, pressure and time conditions the amount of vanadium recovered increases to a maximum as the amount of lime used is increased and then the amount of vanadium recovered decreases as the amount of lime used is further increased. Accordingly, the use of excessive amounts of lime is not warranted. The data for Examples 8, 10, 12, 13 and 14 indicate that at constant lime and time conditions the amount of vanadium recovered increases to a maximum as the temperature and pressure are increased and then the amount of vanadium recovered decreases as the temperature and pressure are further increased. Accordingly, the use of excessive temperatures and pressures is not warranted.

EXAMPLES 20-22

These examples illustrate an alternate procedure for providing the source of calcium oxide (lime) for use in the pressure hydrometallurgical treatment procedure.

A portion of a vanadium-bearing calcitic shale ore sample containing about 75% calcium carbonate was calcined at about 800° C. for one hour to convert the calcium carbonate, i.e., calcite, into lime ash by driving off the carbon dioxide. Portions of the uncalcined ore were admixed with the lime ash in various amounts equivalent to the calcium oxide requirement. The admixture was then slurried in water at a solids content of 20% by weight and heated in an autoclave at about 225° C. and 370 p.s.i.g. for one hour. The product of the autoclave treatment was thereafter carbonated with carbon dioxide to a pH of 6.5 and mixed with 0.5 cubic foot of "Amberlite IRA-425," a strong basic anion exchange resin, per ton of ore and extracted or leached for about 15 minutes at 60° C. while maintaining the desired pH of 6.5 of the slurry through the continuous introduction of carbon dioxide thereto. After screening of the loaded resin from the slurry, the vanadium values were stripped or eluted from the resin, precipitated and calcined to $V_2O_5$ as set forth hereinabove. (The carbon dioxide product of the lime ash-producing calcination procedure may advantageously be utilized to satisfy the various carbon dioxide process requirements.) The results of this procedure are presented in the following Table II.

TABLE II

[$CO_2$-RIP leach of lime ash-treated calcitic shale]

| Example number | Lbs. 800° C. lime ash/ton of ore | Equiv. CaO | Percent $V_2O_5$ extracted |
|---|---|---|---|
| 20 | 400 | 216 | 45 |
| 21 | 300 | 162 | 47 |
| 22 (3-stage resin leach) | 300 | 162 | 52 |

From the data for Examples 20 and 21 in the above Table II vis-a-vis the data for Examples 15 and 13, respectively in the above Table I, it is readily apparent that a portion of the ore can be used (calcined) to provide the source of lime, i.e., equivalent CaO, without adversely affecting the vanadium recovery (i.e., $V_2O_5$ or 45% vs. 48% and 47% vs. 54%). The data for Examples 21 and 22 indicate that a multistage resin leaching or extracting procedure improves the recovery of the vanadium values.

EXAMPLES 23-29

These examples illustrate the alternate procedure for solubilizing the vanadium values of the lime-treated slurry.

A series of tests was performed in which an aqueous admixture of vanadium-bearing calcitic shale ore was treated in an autoclave for one hour at 225° C. with 170 pounds of lime per ton of ore. The autoclave pressure was maintained at 370 p.s.i.g. The treated slurry (20% by weight solids content) was then leached at various time and temperature conditions with a 5% wt./vol. sodium carbonate solution. (In Examples 25 and 28 carbon dioxide was added to lower the pH below 10.5.) Thereafter, the vanadium-containing solution was separated from the solids and the vanadium precipitated and calcined to $V_2O_5$ as set forth hereinabove. The results are presented in the following Table III.

TABLE II

[Soda ash leach of lime-treated calcitic shale]

| Example number | Leach temp. (° C.) | Leach time (hrs.) | Leach pH Initial | Leach pH Final | Percent $V_2O_3$ extraction | $Na_2CO_3$ consumption (lbs./ton of ore) |
|---|---|---|---|---|---|---|
| 23 | 90 | 1.0 | 10.0 | 10.0 | 47 | 40 |
| 24 | 175 | 1.0 | 10.3 | 12.7 | 58 | 70 |
| 25 | 175 | 1.0 | 8.2 | 9.8 | 56 | 65 |
| 26 | 225 | 0.5 | 10.5 | 12.6 | 60 | 68 |
| 27 | 225 | 1.0 | 10.5 | 12.4 | 62 | 72 |
| 28 | 225 | 1.0 | 7.7 | 10.1 | 54 | 63 |
| 29 | 225 | 4.0 | 10.5 | 12.8 | 65 | 56 |

From the data presented in the above Table III, it can be seen that vanadium recoveries as high as 65% $V_2O_5$ are achieved by this alternate vanadium-solubilizing procedure for the lime-treated ore. Leaching the ore directly with various sodium carbonate, e.g., 3% to 10%, solutions but without the lime pressure treatment procedure resulted in vanadium ($V_2O_5$) extractions in the low order of only 2% to 5%.

It will be appreciated that various modifications and changes may be made in the process of the invention by those skilled in the art without departing from the essence thereof. Therefore, the invention is to be limited only within the scope of the appended claims.

What is claimed is:

1. A process for the recovery of vanadium values from a vanadium-bearing calcium-rich ore which comprises the steps of:
    (a) forming an aqueous admixture of said ore with from about 42 pounds to about 425 pounds of calcium oxide per ton of said ore;
    (b) heating said aqueous admixture of step (a) to a temperature between about 150° C. to about 250° C. for from about 0.5 hour to about 2 hours at a pressure of from about 70 p.s.i.g. to about 575 p.s.i.g.;
    (c) solubilizing the vanadium values; and
    (d) recovering the soluble vanadium values.

2. The process as defined in claim 1 wherein said aqueous admixture of step (a) comprises from about 150 pounds to about 225 pounds of calcium oxide per ton of said ore.

3. The process as defined in claim 2 wherein said aqueous admixture of step (a) is heated in step (b) to a temperature between about 175° C. to about 225° C. at a pressure of from 129 p.s.i.g. to about 370 p.s.i.g.

4. The process as defined in claim 2 wherein said aqueous admixture of step (a) has a solids content between about 2% and about 50% by weight.

5. The process as defined in claim 1 wherein the vanadium values are solubilized in step (c) by introducing carbon dioxide into said aqueous admixture of step (b) to adjust the pH thereof to between about pH 5 to about pH 9.

6. The process as defined in claim 5 comprising the further step of admixing a basic anion exchange resin with said aqueous admixture of step (c) to extract the solubilized vanadium values therefrom.

7. The process as defined in claim 1 wherein the vanadium values are solubilized in step (c) by admixing a solution of sodium carbonate, ammonium carbonate or sodium hydroxide with said aqueous admixture of step (b) in an amount of from about 40 pounds to about 72 pounds of such solute per ton of ore and heating at a temperature of from about 90° C. to about 225° C. for from about 0.5 hour to about 4 hours.

References Cited
UNITED STATES PATENTS

| | | | |
|---|---|---|---|
| 1,435,180 | 11/1922 | Schlesinger | 23—19 V |
| 1,531,541 | 3/1925 | Carpenter | 23—19 V |
| 2,193,092 | 3/1940 | Frick et al | 23—19 V |
| 2,257,978 | 10/1941 | Robertson et al. | 23—18 |
| 3,656,936 | 4/1972 | Haas | 75—101 R |

HERBERT T. CARTER, Primary Examiner